US 12,400,385 B2

(12) United States Patent
Umaishi et al.

(10) Patent No.: US 12,400,385 B2
(45) Date of Patent: Aug. 26, 2025

(54) INFORMATION PROCESSING APPARATUS, INFORMATION PROCESSING METHOD, PROGRAM, AND INFORMATION PROCESSING SYSTEM

(71) Applicant: FUJIFILM Corporation, Tokyo (JP)

(72) Inventors: Naoto Umaishi, Tokyo (JP); Kyota Watanabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 127 days.

(21) Appl. No.: 18/472,749

(22) Filed: Sep. 22, 2023

(65) Prior Publication Data
US 2024/0013460 A1 Jan. 11, 2024

Related U.S. Application Data

(63) Continuation of application No. PCT/JP2022/011197, filed on Mar. 14, 2022.

(30) Foreign Application Priority Data

Mar. 23, 2021 (JP) ................. 2021-048926

(51) Int. Cl.
G06T 11/60 (2006.01)
G06T 7/70 (2017.01)
G09G 5/377 (2006.01)

(52) U.S. Cl.
CPC ............. *G06T 11/60* (2013.01); *G06T 7/70* (2017.01); *G09G 5/377* (2013.01); *G06T 2207/10028* (2013.01)

(58) Field of Classification Search
None
See application file for complete search history.

(56) References Cited

U.S. PATENT DOCUMENTS 7,418,320 B1* 8/2008 Bodin ................. G05D 1/0094
701/411
11,528,411 B2* 12/2022 Horita ................. H04N 23/698
(Continued)

FOREIGN PATENT DOCUMENTS

JP H11-187363 A 7/1999
JP 2007-073038 A 3/2007
(Continued)

OTHER PUBLICATIONS

International Search Report issued in PCT/JP2022/011197; mailed May 31, 2022.
(Continued)

*Primary Examiner* — Robert J Craddock
(74) *Attorney, Agent, or Firm* — Studebaker Brackett PLLC

(57) ABSTRACT

The information processing apparatus includes a processor and a memory which stores a program to be executed by the processor. The information processing apparatus acquires position and attitude information representing a position of a camera mounted on a flying object and an attitude of the camera, acquires camera configuration information including an optical configuration of the camera, calculates an imaging range of the camera based on the position and attitude information and the camera configuration information, acquires a survey range map showing a survey range, acquires survey target house information including a position of a survey target house in the survey range map, determines whether or not the survey target house is included in the imaging range, specifies a not-yet-imaged house that does not have a history of being determined to be included in the imaging range, and superimposes information on the not-yet-imaged house on the survey range map.

15 Claims, 10 Drawing Sheets

(56) References Cited

U.S. PATENT DOCUMENTS

2019/0346271 A1\* 11/2019 Zhang .................... G05D 1/245
2019/0373184 A1\* 12/2019 Kawaguchi ............ B64U 10/14

FOREIGN PATENT DOCUMENTS

| JP | 2012-026848 A | 2/2012 |
| JP | 2012-137933 A | 7/2012 |
| JP | 2020-001586 A | 1/2020 |
| WO | 2013/051300 A1 | 4/2013 |

OTHER PUBLICATIONS

Written Opinion of the International Searching Authority issued in PCT/JP2022/011197; mailed May 31, 2022.
An Office Action; "Notice of Reasons for Refusal," mailed by the Japanese Patent Office on Jun. 11, 2025, which corresponds to Japanese Patent Application No. 2023-509027 and is related to U.S. Appl. No. 18/472,749; with English language translation.

\* cited by examiner

INFORMATION PROCESSING APPARATUS, INFORMATION PROCESSING METHOD, PROGRAM, AND INFORMATION PROCESSING SYSTEM

CROSS-REFERENCE TO RELATED APPLICATIONS

The present application is a Continuation of PCT International Application No. PCT/JP2022/011197 filed on Mar. 14, 2022 claiming priority under 35 U.S.C § 119(a) to Japanese Patent Application No. 2021-048926 filed on Mar. 23, 2021. Each of the above applications is hereby expressly incorporated by reference, in its entirety, into the present application.

BACKGROUND OF THE INVENTION

1. Field of the Invention

The present invention relates to an information processing apparatus, an information processing method, a program, and an information processing system.

2. Description of the Related Art

In a flight imaging system in the related art, an image obtained from a camera mounted on a flying object is displayed on a monitor installed on a ground, and, through the image displayed on the monitor, an imaging person performs imaging while checking the image.

JP1999-187363A (JP-H11-187363A) discloses a mobile station video transmission system comprising a mobile station on which a camera is mounted and a reception station that receives a captured image of the camera transmitted from the mobile station. The system disclosed in JP1999-187363A (JP-H11-187363A) generates a map image showing a position and an imaging range of the mobile station, and the like by using the captured image of the camera transmitted from the mobile station and incidental data of the captured image, and displays the generated map image on a monitor.

The imaging range of the mobile station is generated by computing four corner coordinates of the imaging range from position data of a helicopter constituting the mobile station, attitude angle data of the helicopter, orientation direction data of the camera, and a zoom ratio of the camera.

JP2020-1586A discloses a structure deterioration inspection support system that generates a three-dimensional model of a structure from an image group obtained by imaging the structure from a plurality of viewpoints and that displays the three-dimensional model of the structure.

In the system disclosed in JP2020-1586A, on an individual screen in which an image selected by a user from a plurality of images is displayed, the image is displayed such that the user can see a portion of a not-yet-imaged range of the structure. Accordingly, the user can recognize a deterioration inspection omission portion in the structure.

WO2013/051300A discloses a disaster situation grasping system that grasps a situation of a disaster area based on an image captured aerially from a flying object such as a helicopter. In the system disclosed in WO2013/051300A, in a case in which a disaster occurs, a marker is attached to a damaged structure, and relevant information related to the structure is displayed.

SUMMARY OF THE INVENTION

However, in a housing damage certification survey conducted by a local government, at least one image in which a survey target house is captured is required. The survey target house that is left out of the imaging performed using the camera provided in the flying object is captured by an on-site investigator. In that case, the leave-out of the imaging using the flying object may cause a delay in issuance of a disaster certificate.

The flight imaging system in the related art has difficulty in determining whether or not one or more captured images have been obtained for all the survey target houses. In addition, in a case in which imaging is performed using the camera provided in the flying object, it is difficult to determine a not-yet-imaged house from the image displayed on the monitor. In addition, it is difficult to guide the flying object to the not-yet-imaged house.

In the system disclosed in JP1999-187363A (JP-H11-187363A), the imaging range captured by the camera is displayed on a map, and a location of a disaster area is specified from the map, but it is difficult to specify the not-yet-imaged house in the disaster area from the map.

The system disclosed in JP2020-1586A can grasp the deterioration inspection omission portion of the structure, but JP2020-1586A does not disclose specification of a not-yet-imaged structure.

The system disclosed in WO2013/051300A can grasp characteristics of a disaster-stricken structure, but it is difficult to specify a not-yet-imaged structure in an imaging area.

The present invention has been made in view of such circumstances, and an object of the present invention is to provide an information processing apparatus, an information processing method, a program, and an information processing system which can support specification of a not-yet-imaged house in a case of imaging a survey range.

An information processing apparatus according to the present disclosure is an information processing apparatus comprising: a processor; and a memory in which a program to be executed by the processor is stored, in which the processor executes a command of the program to acquire position and attitude information representing a position of a camera mounted on a flying object and an attitude of the camera, acquire camera configuration information including an optical configuration of the camera, calculate an imaging range of the camera based on the position and attitude information and the camera configuration information, acquire a survey range map showing a survey range, acquire survey target house information including a position of a survey target house in the survey range map, determine whether or not the survey target house is included in the imaging range, specify a not-yet-imaged house that does not have a history of being determined to be included in the imaging range, and superimpose information on the not-yet-imaged house on the survey range map.

According to the information processing apparatus according to the present disclosure, a not-yet-imaged-house image corresponding to the not-yet-imaged house that does not have a history of being determined to be included in the imaging range of the camera is superimposed on the survey range map. Accordingly, the not-yet-imaged house can be specified.

In the survey range map, as a geographical condition of a survey range, a map of the survey range and an aerial photograph of the survey range can be applied.

An information processing apparatus may comprise a display device, and the processor may transmit a display signal representing the survey range map on which the not-yet-imaged-house image is superimposed, to the display device. In such an aspect, the display device can display the survey range map on which the not-yet-imaged-house image is superimposed.

In the information processing apparatus according to another aspect, the processor superimposes, on the survey range map, a not-yet-imaged-house image corresponding to the not-yet-imaged house.

According to such an aspect, visibility of the not-yet-imaged house can be improved.

In the information processing apparatus according to still another aspect, the processor superimposes, on the survey range map, information on an imaged house having a history in which the survey target house is determined to be included in the imaging range.

According to such an aspect, the imaged house can be specified.

In the information processing apparatus according to still another aspect, the processor superimposes, on the survey range map, an imaged-house image corresponding to the imaged house.

According to such an aspect, visibility of the imaged house can be improved.

In the information processing apparatus according to still another aspect, the processor superimposes, on the survey range map, camera position information representing a position of the camera in the survey range map.

According to such an aspect, visibility of the position of the camera can be improved.

In the information processing apparatus according to still another aspect, the processor superimposes, on the survey range map, first navigation information representing a direction in which the not-yet-imaged house is located.

According to such an aspect, a direction in which the not-yet-imaged house is located can be specified.

In such an aspect, as the first navigation information, a first navigation image representing the first navigation information can be applied.

In the information processing apparatus according to still another aspect, the processor superimposes, on the survey range map, the first navigation information including information representing the number of the not-yet-imaged houses in the direction represented by the first navigation information.

According to such an aspect, the number of the not-yet-imaged houses in the direction in which the not-yet-imaged house is located can be specified.

In the information processing apparatus according to still another aspect, the processor superimposes, on the survey range map, second navigation information representing a distance and a direction from the imaging range to the not-yet-imaged house of interest.

According to such an aspect, the direction of the not-yet-imaged house of interest and the distance to the not-yet-imaged house of interest can be specified.

As the second navigation information in such an aspect, a second navigation image representing the second navigation information can be applied. The second navigation image can include text information.

In the information processing apparatus according to still another aspect, the processor superimposes, on the survey range map, third navigation information including a wide area map in which an entirety of the survey range map is reduced.

According to such an aspect, a position of a survey map in the entire survey range can be specified.

As the third navigation information in such an aspect, a third navigation image representing the third navigation information can be applied.

In the information processing apparatus according to still another aspect, the processor acquires the position of the camera, an altitude of the camera, an orientation of an optical axis of the camera, and a depression angle of the optical axis, as the position and attitude information.

According to such an aspect, an angle of view of the camera can be specified.

In the information processing apparatus according to still another aspect, the processor determines whether or not the not-yet-imaged house is included in the imaging range in a case in which the imaging range moves according to movement of the flying object.

According to such an aspect, a captured image of the entire survey range can be acquired by performing imaging a plurality of times.

In the information processing apparatus according to still another aspect, the processor stores a history in which the survey target house is determined to be included in the imaging range.

According to such an aspect, the not-yet-imaged house can be specified based on a determination history of the survey target house.

An information processing method according to the present disclosure is an information processing method executed by a computer, the method comprising: acquiring position and attitude information representing a position of a camera mounted on a flying object and an attitude of the camera; acquiring camera configuration information including an optical configuration of the camera; calculating an imaging range of the camera based on the position and attitude information and the camera configuration information; acquiring a survey range map showing a survey range; acquiring survey target house information including a position of a survey target house in the survey range map; determining whether or not the survey target house is included in the imaging range; specifying a not-yet-imaged house that does not have a history of being determined to be included in the imaging range; and superimposing information on the not-yet-imaged house on the survey range map.

According to the information processing method according to the present disclosure, it is possible to obtain the same operation and effect as those of the information processing apparatus according to the present disclosure. Configuration requirements of an information processing apparatus according to still another aspect can be applied to configuration requirements of an information processing method according to still another aspect.

A program according to the present disclosure is a program causing a computer to realize: a function of acquiring position and attitude information representing a position of a camera mounted on a flying object and an attitude of the camera; a function of acquiring camera configuration information including an optical configuration of the camera; a function of calculating an imaging range of the camera based on the position and attitude information and the camera configuration information; a function of acquiring a survey range map showing a survey range; a function of acquiring survey target house information including a position of a survey target house in the survey range map; a function of determining whether or not the survey target house is included in the imaging range; a function of specifying a not-yet-imaged house that does not have a history of being determined to be included in the imaging range; and a function of superimposing information on the not-yet-imaged house on the survey range map.

According to the program according to the present disclosure, it is possible to obtain the same operation and effect as those of the information processing apparatus according to the present disclosure. Configuration requirements of an information processing apparatus according to still another aspect can be applied to configuration requirements of a program according to still another aspect.

An information processing system according to the present disclosure is an information processing system comprising: a flying object; a camera mounted on the flying object; and an information processing apparatus equipped with a processor and a memory in which a program to be executed by the processor is stored, in which the processor executes a command of the program to acquire position and attitude information representing a position of the camera mounted on the flying object and an attitude of the camera, acquire camera configuration information including an optical configuration of the camera, calculate an imaging range of the camera based on the position and attitude information and the camera configuration information, acquire a survey range map showing a survey range, acquire survey target house information including a position of a survey target house in the survey range map, determine whether or not the survey target house is included in the imaging range, specify a not-yet-imaged house that does not have a history of being determined to be included in the imaging range, and superimpose information on the not-yet-imaged house on the survey range map.

According to the information processing system according to the present disclosure, it is possible to obtain the same operation and effect as those of the information processing apparatus according to the present disclosure. Configuration requirements of an information processing apparatus according to still another aspect can be applied to configuration requirements of an information processing system according to still another aspect.

According to the present invention, the not-yet-imaged-house image corresponding to the not-yet-imaged house that does not have a history of being determined to be included in the imaging range of the camera is superimposed on the survey range map. Accordingly, the not-yet-imaged house can be specified.

DESCRIPTION OF THE PREFERRED EMBODIMENTS

Figure 1:
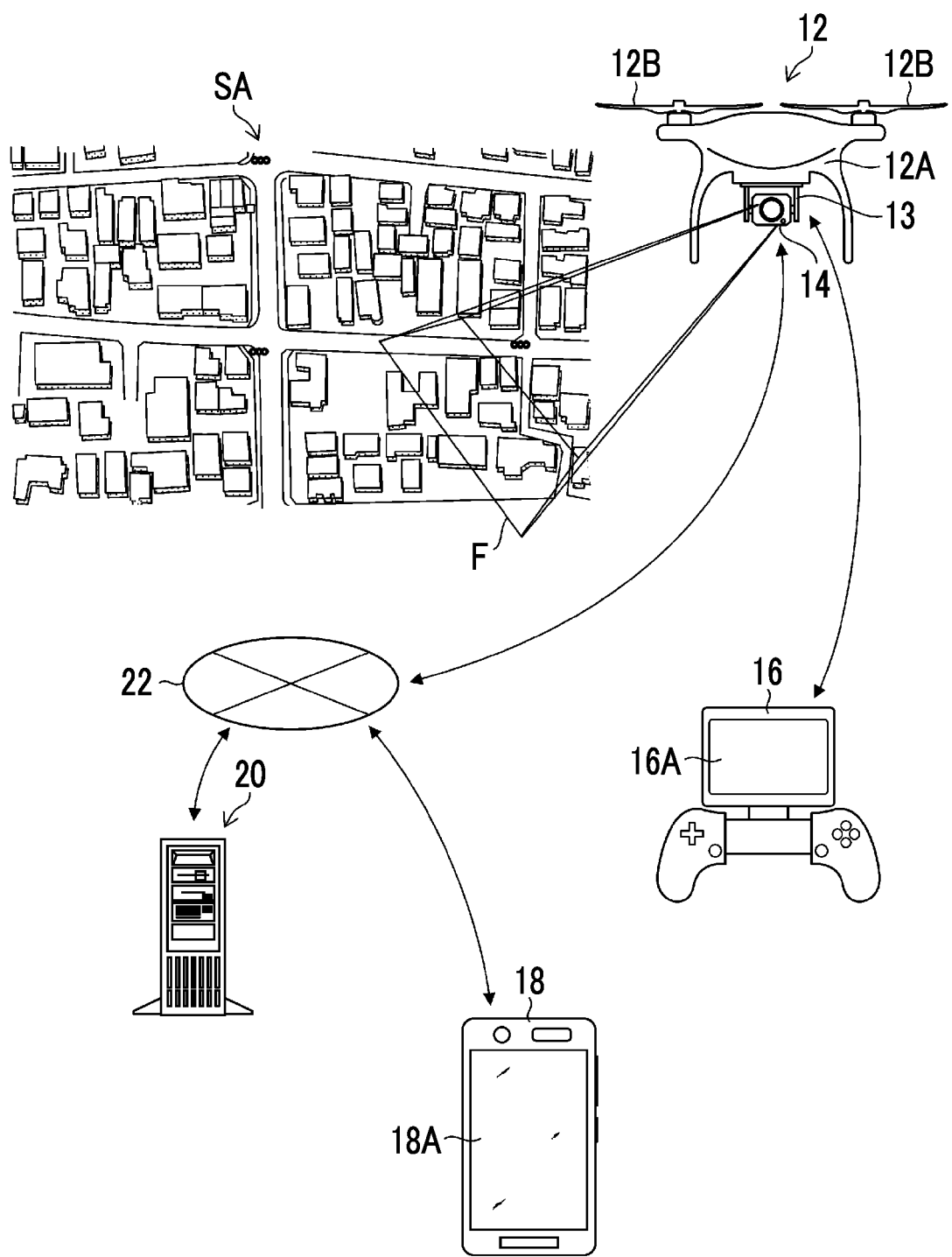
FIG. 1 is a schematic diagram showing a configuration example of an information processing system according to an embodiment.

Hereinafter, preferred embodiments of the present invention will be described with reference to the accompanying drawings. In the present specification, the same components are denoted by the same reference numerals, and duplicate description thereof will be omitted as appropriate.

[Configuration Example of Image Processing System According to Embodiment]
[Overall Configuration]

FIG. 1 is a schematic diagram showing a configuration example of an information processing system according to an embodiment. Hereinafter, an information processing system that processes various types of information acquired in flight imaging will be described by taking, as an example, a housing damage certification survey conducted in a case of issuing a disaster certificate.

An information processing system 10 shown in FIG. 1 comprises an imaging drone 12, a camera 14, a controller 16, a terminal device 18, and a server 20. The imaging drone 12, the camera 14, the terminal device 18, and the server 20 may perform data communication with each other via a network 22.

In FIG. 1, an arrow line representing data communication between the imaging drone 12 and the network 22 and an arrow line representing data communication between the camera 14 and the network 22 are illustrated using a single arrow line.

The imaging drone 12 and the camera 14 may individually perform data communication with the network 22, and data communication between the imaging drone 12 and the network 22 and data communication between the camera 14 and the network 22 may be shared.

The imaging drone 12 is an unmanned aerial vehicle that is remotely controlled using the controller 16. The imaging drone 12 may have an auto-pilot function of flying according to a predetermined program. The imaging drone 12 described in the embodiment is an example of a flying object.

The camera 14 is supported on a lower part of a main body 12A of the imaging drone 12 using a gimbal 13, and is mounted on the imaging drone 12. The lower part of the main body 12A of the imaging drone 12 represents a side opposite to a rotor 12B in a case in which a position where the rotor 12B is attached is an upper part of the main body 12A of the imaging drone 12.

The gimbal 13 rotatably supports the camera 14. The gimbal 13 may rotatably support the camera 14 in each of two rotation axis directions orthogonal to each other.

The camera 14 comprises an optical system and an image sensor. The optical system includes one or more lenses such as a focus lens. As the image sensor, a CCD image sensor, a CMOS image sensor, or the like can be applied. Note that CCD is an abbreviation for Charge Coupled Device. CMOS is an abbreviation for Complementary Metal-Oxide Semiconductor.

The optical system and the image sensor are not shown in FIG. 1. An imaging lens included in the optical system is illustrated with reference numeral 14B in FIG. 7. In addition, the image sensor is illustrated with reference numeral 14A in FIG. 7.

The camera 14 forms an image of subject light received from an imaging range F on an imaging plane of an imaging element. The imaging element outputs an electric signal representing the received subject light. The camera 14 uses a signal processing circuit to generate an image signal of a subject from the electric signal representing the subject light, and outputs the image signal of the subject. The camera 14 may transmit an image signal representing a live view image to the controller 16. A display 16A of the controller 16 may display the live view image.

The camera 14 images a house in a survey range SA from the sky above the survey range SA. The camera 14 performs at least one time of imaging to generate one or more still images for the entire range of the survey range SA. The camera 14 can image a plurality of houses in one time of imaging. One time of imaging is synonymous with generation of one still image.

For example, the camera 14 changes the imaging range F according to movement of the imaging drone 12, performs imaging for the entire range of the survey range SA, and generates a plurality of still images corresponding to the entire range of the survey range SA.

The controller 16 transmits a control signal in a wireless format to the imaging drone 12 to control an operation of the imaging drone 12. That is, in response to an operation of the controller 16 by an operator, a control signal representing a rotation direction and a rotation speed of the rotor 12B is transmitted from the controller 16 to the imaging drone 12. The imaging drone 12 performs ascending, descending, turning, forward/backward/left/right movement, hovering, and the like based on the control signal transmitted from the controller 16.

The controller 16 may perform data communication with the terminal device 18 and the server 20 via the network 22.

The terminal device 18 functions as an information processing apparatus that supports an operation of the imaging drone 12. The terminal device 18 acquires a survey range map representing geographical information of the survey range SA. The terminal device 18 can superimpose various types of information, such as information representing an imaging history of the camera 14, on the survey range map.

The terminal device 18 comprises a display 18A. The terminal device 18 uses the display 18A to display the survey range map representing the geographical information of the survey range SA. Details of the survey range map will be described below.

The terminal device 18 may have a function of the controller 16. That is, the terminal device 18 may have a wireless communication function with the imaging drone 12 and a function of executing a control program of the imaging drone 12.

A computer is applied to the server 20. A form of the computer may be a personal computer or a workstation. The server 20 acquires various types of information transmitted from each of the imaging drone 12, the camera 14, and the terminal device 18.

Wireless communication in 2.4 gigahertz band or the like can be applied to the network 22. Any wired communication can be applied to the network 22. A combination of wireless communication and wired communication may be applied to the network 22. Any communication standard can be applied to the network 22. The network 22 may be electrically connected to a computer or the like provided in a survey base or the like in a communicable manner.

[Configuration Example of Imaging Drone]

Figure 2:
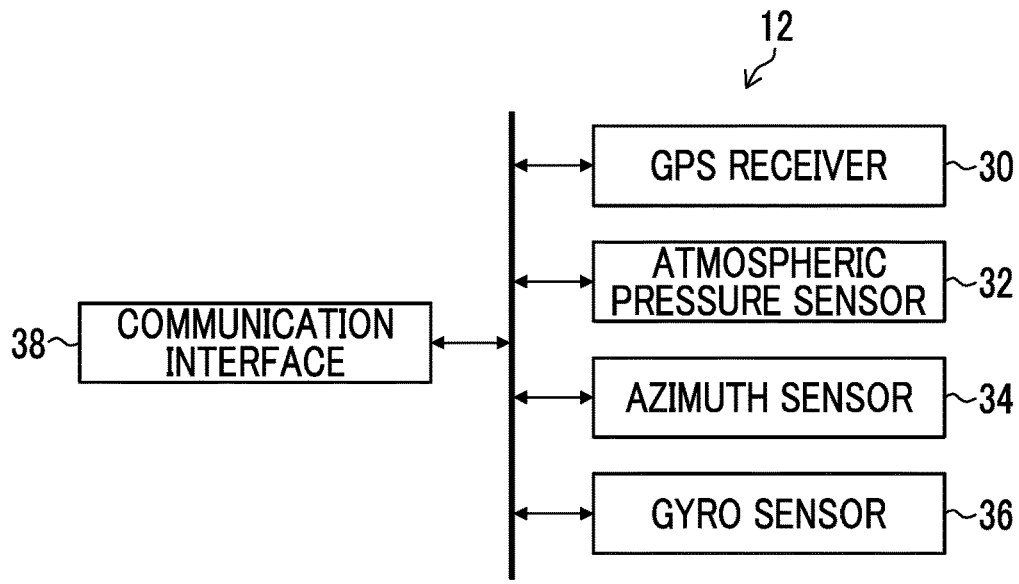
FIG. 2 is a functional block diagram showing an electric configuration of an imaging drone shown in FIG. 1.

FIG. 2 is a functional block diagram showing an electric configuration of the imaging drone shown in FIG. 1. The imaging drone 12 comprises a GPS receiver 30, an atmospheric pressure sensor 32, an azimuth sensor 34, a gyro sensor 36, and a communication interface 38. Note that GPS is an abbreviation for Global Positioning System.

The GPS receiver 30 acquires a latitude and a longitude of the imaging drone 12. The atmospheric pressure sensor 32 detects an atmospheric pressure in the imaging drone 12. The imaging drone 12 acquires an altitude of the imaging drone 12 based on the atmospheric pressure detected using the atmospheric pressure sensor 32. The latitude, longitude, and altitude of the imaging drone 12 constitute position information of the imaging drone 12.

The acquisition of the information on the altitude of the imaging drone 12 includes an aspect of calculating the altitude of the imaging drone 12 from the atmospheric pressure detected using the atmospheric pressure sensor 32. That is, the acquisition may include the meaning of information generation such as computation, estimation, and calculation.

The azimuth sensor 34 detects a predetermined azimuth of the imaging drone 12 in a forward direction. The imaging drone 12 acquires a traveling direction of the imaging drone 12 based on the azimuth acquired using the azimuth sensor 34.

The gyro sensor 36 detects a roll angle representing a rotation angle with respect to a roll axis, a pitch angle representing a rotation angle with respect to a pitch axis, and a yaw angle representing a rotation angle with respect to a yaw axis. The imaging drone 12 acquires attitude information of the imaging drone 12 based on the rotation angles acquired using the gyro sensor 36.

That is, the imaging drone 12 may comprise a computation processing unit that calculates parameters and the like applied to the control of the imaging drone 12 from various types of information acquired using various sensors. A combination of a processor and a memory can be applied to the computation processing unit. Details of the processor and the memory will be described below.

The communication interface 38 controls the wireless communication of the imaging drone 12 performed via the network 22. The communication interface 38 may comprise a communication terminal corresponding to wired communication.

The imaging drone 12 comprises a battery and a charging terminal for the battery. The imaging drone 12 may comprise a residual amount meter that notifies of a residual amount of the battery. The residual amount meter may transmit the residual amount information of the battery to the controller 16 via the communication interface 38. The battery, the charging terminal, and the residual amount meter are not shown.

[Configuration Example of Controller]

Figure 3:
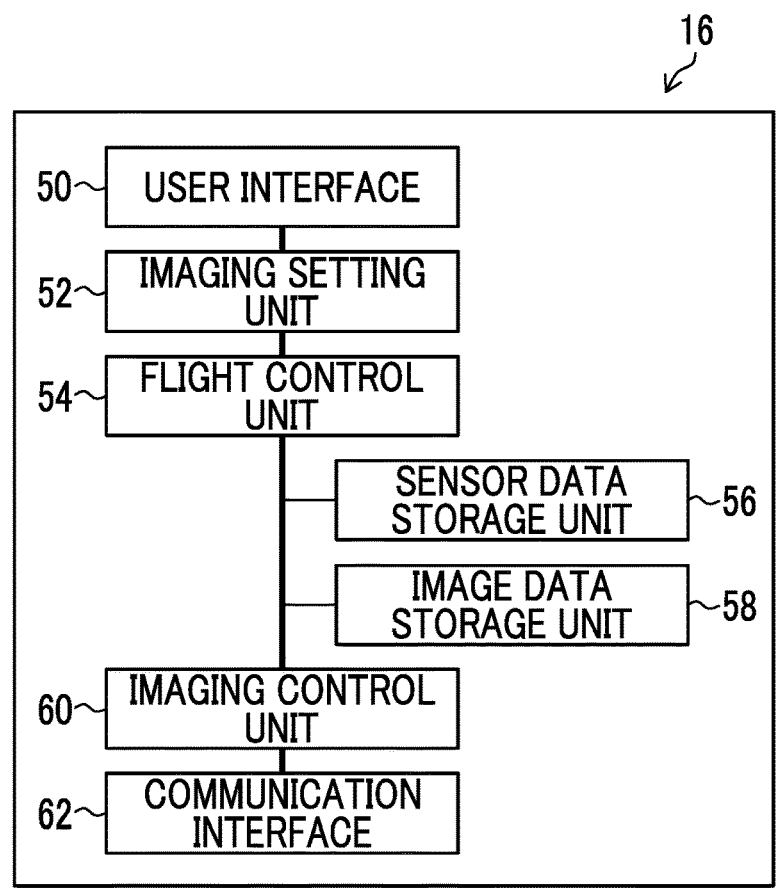
FIG. 3 is a functional block diagram of a controller shown in FIG. 1.

FIG. 3 is a functional block diagram of the controller shown in FIG. 1. The controller 16 comprises a user interface 50, an imaging setting unit 52, a flight control unit 54, a sensor data storage unit 56, an image data storage unit 58, an imaging control unit 60, and a communication interface 62.

The user interface 50 includes an operation member operated by an operator, such as a joystick and a button, and the display 16A. The operation member outputs an operation signal corresponding to the operation of the operator. The display 16A displays various types of information related to the control of the imaging drone 12.

The imaging setting unit 52 generates imaging setting based on the operation of the operator and the plan of the housing damage certification survey, and transmits the imaging setting to the camera 14. The camera 14 performs imaging based on the imaging setting.

The flight control unit 54 generates flight setting based on the operation of the operator and the plan of the housing damage certification survey, and transmits the flight setting to the imaging drone 12. The imaging drone 12 flies based on the flight setting.

The sensor data storage unit 56 stores sensor data transmitted from each of the atmospheric pressure sensor 32, the azimuth sensor 34, and the gyro sensor 36 provided in the imaging drone 12. The flight control unit 54 controls the flight of the imaging drone 12 based on the sensor data stored in the sensor data storage unit 56.

The image data storage unit 58 stores image data transmitted from the camera 14. The image data may be associated with an imaging date and time, an imaging condition set in the camera 14, the sensor data, and the like. The display 16A may display an image represented by the image data stored in the image data storage unit 58.

The imaging control unit 60 controls still image capturing of the camera 14 based on the imaging setting and the flight setting. The imaging control unit 60 may control the still image capturing of the camera 14 in response to the operation of the operator. That is, the imaging control unit 60 adjusts an angle of view of the camera 14 at a predetermined imaging position, and causes the camera 14 to perform imaging. The imaging control unit 60 acquires the image data from the camera 14 and stores the acquired image data in the image data storage unit 58.

The communication interface 62 performs wireless communication with the communication interface 38 provided in the imaging drone 12. The communication interface 62 may be electrically connected to the network 22 shown in FIG. 1 in a data communicable manner.

[Configuration Example of Terminal Device]

Figure 4:
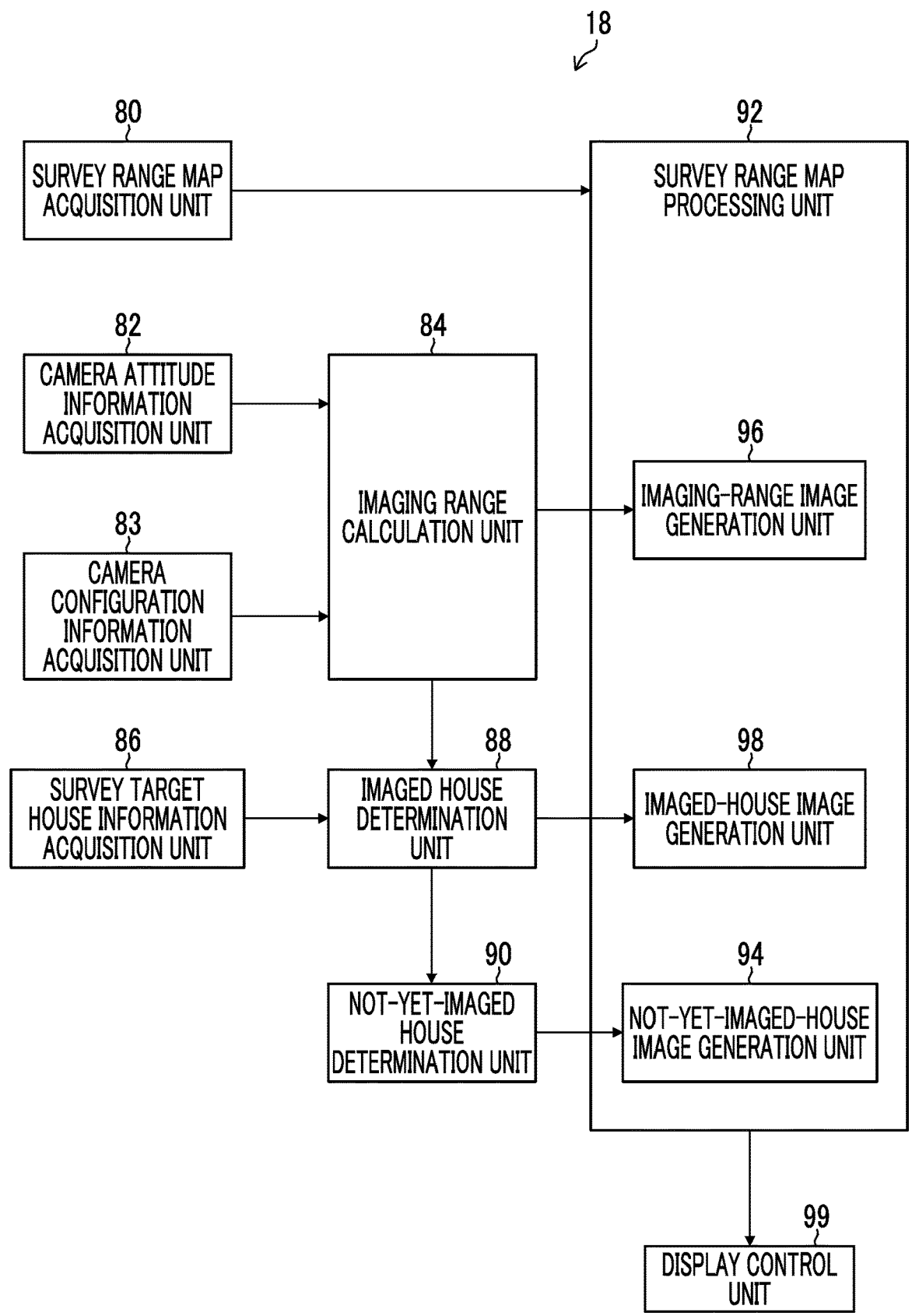
FIG. 4 is a functional block diagram of a terminal device shown in FIG. 1.

FIG. 4 is a functional block diagram of the terminal device shown in FIG. 1. The terminal device 18 comprises a survey range map acquisition unit 80. The survey range map acquisition unit 80 acquires a map of the survey range or geographical information corresponding to the map from the server 20 shown in FIG. 1.

As the survey range map, a map of the survey range SA that specifies an address or the like of the survey target house can be applied. As the survey range map, an aerial photograph of the survey range SA may be applied, or a processed map image in which components of the map are replaced with schematized images may be applied.

For example, as the survey range map, a map image to which various types of geographical information are added based on the map of the survey range SA or the aerial photograph of the survey range SA can be applied. The geographical information may include text, photographs, illustrations, figures, and symbols.

The acquisition of the survey range map may include an aspect of acquiring the geographical information of the survey range and generating the survey range map based on the geographical information of the survey range. The acquisition of the survey range map may include an aspect of acquiring the map of the survey range and processing the map of the survey range.

A two-dimensional coordinate system is set for the survey range map. As the two-dimensional coordinate system, an orthogonal coordinate system can be applied. As the origin of the two-dimensional coordinate system, any position in the survey range map can be applied. Any position in the survey range map can be defined using coordinate values.

The terminal device 18 comprises a camera attitude information acquisition unit 82. The camera attitude information acquisition unit 82 acquires sensor information from the imaging drone 12 at a predetermined imaging position, and acquires camera attitude information representing the attitude of the camera 14 at a predetermined imaging position based on the acquired sensor information.

The terminal device 18 comprises a camera configuration information acquisition unit 83. The camera configuration information acquisition unit 83 acquires camera configuration information including an optical configuration of the camera 14, such as a focal length of the imaging lens provided in the camera 14 and a size of the image sensor provided in the camera 14, from the camera 14.

The terminal device 18 can acquire and store the camera configuration information as a constant in advance. For example, the terminal device 18 may acquire identification information of the camera 14, and acquire the camera configuration information that matches the identification information from the server 20.

The terminal device 18 comprises an imaging range calculation unit 84. The imaging range calculation unit 84 calculates the imaging range F of the camera 14 on the ground in a case in which the imaging drone 12 is located at a predetermined imaging position, based on the camera attitude information acquired using the camera attitude information acquisition unit 82 and the camera configuration information acquired using the camera configuration information acquisition unit 83.

The imaging range calculation unit 84 calculates coordinate values of the imaging range F of the camera 14 in the survey range map. For example, the imaging range calculation unit 84 calculates coordinate values of apexes constituting a trapezoidal shape representing the imaging range F of the camera 14.

The terminal device 18 comprises a survey target house information acquisition unit 86. The survey target house information acquisition unit 86 acquires survey target house information including the address, shape, and the like of the survey target house. The survey target house information is applied to the specification of the survey target house in the survey range map acquired by using the survey range map acquisition unit 80.

The survey target house information acquisition unit 86 calculates coordinate values of the survey target houses in the survey range map. The survey target house information acquisition unit 86 calculates coordinate values of apexes constituting a polygonal shape representing the survey target house.

The terminal device 18 comprises an imaged house determination unit 88. The imaged house determination unit 88 determines the survey target house included in the imaging range F of the camera 14 as the imaged house. The imaged house determination unit 88 stores imaged house information related to the imaged house. The imaged house determination unit 88 stores, as the imaged house information, coordinate values of apexes constituting a polygonal shape representing the imaged house.

The imaged house determination unit 88 stores a history of determination results for all the survey target houses. A storage device provided in the terminal device 18 is applied to store the history of the determination results.

The terminal device 18 comprises a not-yet-imaged house determination unit 90. The not-yet-imaged house determination unit 90 determines a house that is not included in the imaging range F of the camera 14 as a not-yet-imaged house. The not-yet-imaged house determination unit 90 stores not-yet-imaged house information related to the not-yet-imaged house. The not-yet-imaged house determination unit 90 stores, as the not-yet-imaged house information, coordinate values of apexes constituting a polygonal shape representing the not-yet-imaged house.

The terminal device 18 comprises a survey range map processing unit 92. The survey range map processing unit 92 performs processing of the survey range map, such as superimposing the not-yet-imaged house information on the survey range map.

The survey range map processing unit 92 may superimpose imaging range information of the camera 14 at the imaging position where the still image capturing is performed on the survey range map. The survey range map processing unit 92 may superimpose the imaged house information on the survey range map.

The survey range map processing unit 92 comprises a not-yet-imaged-house image generation unit 94. The not-yet-imaged-house image generation unit 94 generates a not-yet-imaged-house image representing the not-yet-imaged house. In addition, the survey range map processing unit 92 may comprise an imaging-range image generation unit 96. The imaging-range image generation unit 96 generates an imaging-range image representing the imaging range F of the camera 14. Further, the survey range map processing unit 92 comprises an imaged-house image generation unit 98. The imaged-house image generation unit 98 generates an imaged-house image representing the imaged house.

The display control unit 99 transmits a display signal representing the survey range map processed as described above, to the display 18A. For example, the display control unit 99 can transmit a display signal representing the survey range map on which the imaged-house image is superimposed, to the display 18A.

Figure 5:
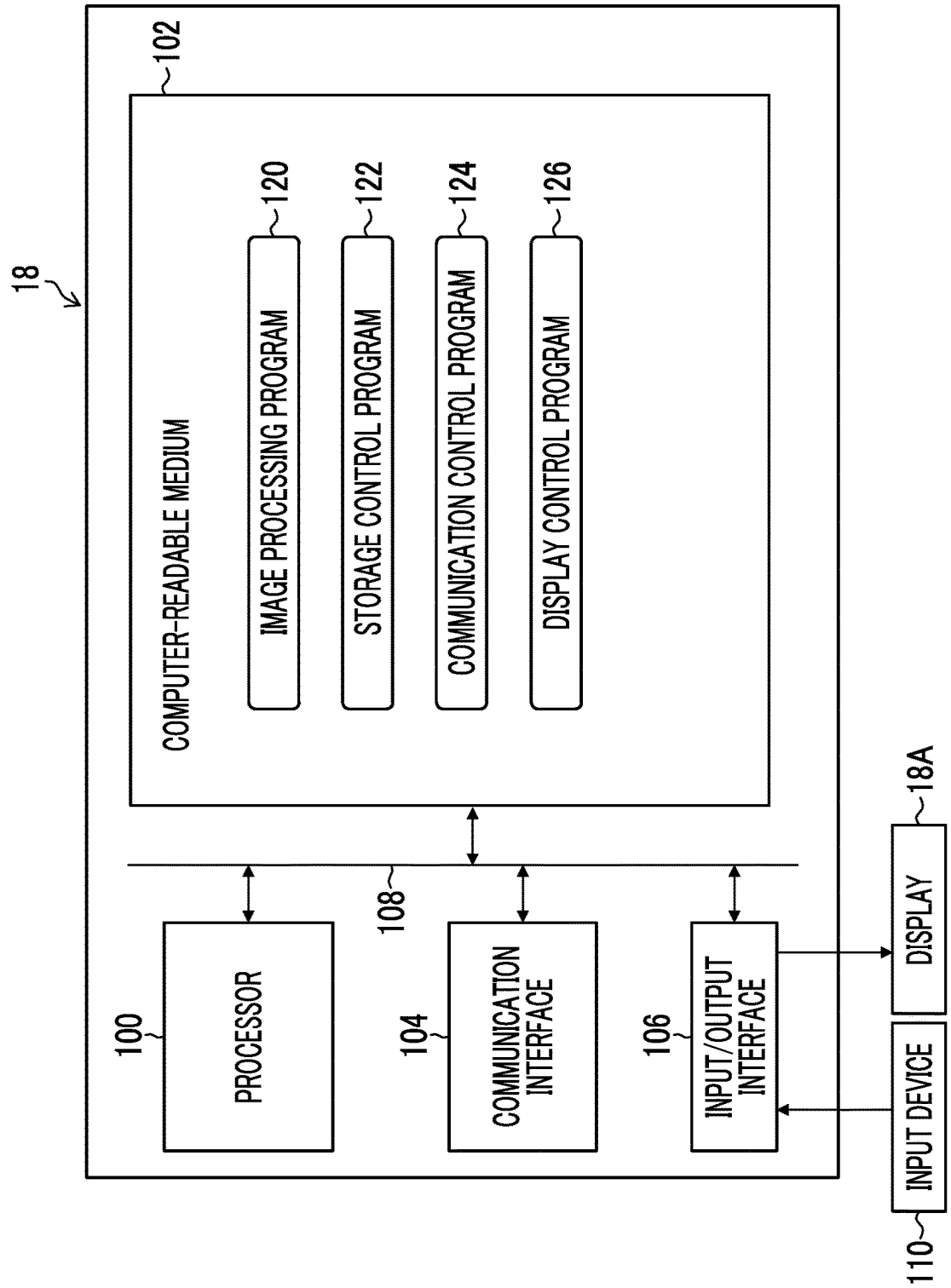
FIG. 5 is a block diagram showing a configuration example of hardware of the terminal device.

FIG. 5 is a block diagram showing a configuration example of hardware of the terminal device. The terminal device 18 comprises a processor 100, a computer-readable medium 102 that is a non-transitory tangible object, a communication interface 104, and an input/output interface 106. The terminal device 18 comprises an input device 110 and a display 18A.

The processor 100 includes a central processing unit (CPU). The processor 100 may include a graphics processing unit (GPU). The processor 100 is connected to the computer-readable medium 102, the communication interface 104, and the input/output interface 106 via the bus 108. The input device 110 and the display 18A are connected to the bus 108 via the input/output interface 106.

The computer-readable medium 102 includes a memory which is a main memory and a storage which is an auxiliary memory. As the computer-readable medium 102, a semiconductor memory such as a read only memory (ROM) and a random access memory (RAM), a hard disk apparatus, a solid state drive apparatus, or the like can be applied. Any combination of a plurality of devices can be applied to the computer-readable medium 102.

The hard disk apparatus can be referred to as an HDD which is an abbreviation for Hard Disk Drive in English. The solid state drive apparatus can be referred to as an SSD which is an abbreviation for Solid State Drive in English.

The terminal device 18 is connected to the network 22 shown in FIG. 1 via the communication interface 104, and is communicably connected to the imaging drone 12, the server 20, and the like via the network 22.

The computer-readable medium 102 stores various programs corresponding to various functions of the terminal device 18, such as an image processing program 120, a storage control program 122, a communication control program 124, and a display control program 126.

The image processing program 120 corresponds to processing functions of the survey range map, such as the survey range map acquisition unit 80 and the survey range map processing unit 92 shown in FIG. 5. For example, the image processing program 120 performs processing of the survey range map acquired by using the survey range map acquisition unit 80.

In addition, the image processing program 120 generates an image representing various types of information to be superimposed on the survey range map, such as the not-yet-imaged house information, and performs processing of superimposing various types of information on the survey range map.

The storage control program 122 controls storage of various types of data. The storage control program 122 controls storage of image data representing various images generated by using the image processing program 120. The storage control program 122 controls storage of various types of information acquired by the terminal device 18.

The communication control program 124 controls communication performed via the communication interface 104. The display control program 126 controls display of various types of information on the display 18A.

Various programs stored in the computer-readable medium 102 include one or more commands. The computer-readable medium 102 stores various types of data, various parameters, and the like.

In the terminal device 18, the processor 100 executes various programs stored in the computer-readable medium 102 to realize various functions in the terminal device 18. Note that the term "program" is synonymous with the term "software".

The terminal device 18 performs data communication with an external device via the communication interface 104. Various standards such as universal serial bus (USB) can be applied to the communication interface 104. As a communication form of the communication interface 104, either wired communication or wireless communication may be applied.

The input device 110 and the display 18A are connected to the terminal device 18 via the input/output interface 106. An input device such as a keyboard or a mouse is applied to the input device 110. A touch panel system can be applied to the input device 110.

As the display 18A, a liquid crystal display, an organic EL display, or the like can be applied. Any combination of a plurality of devices can be applied to the display 18A. The term "EL" of an organic EL display is an abbreviation for Electro-Luminescence.

Here, examples of a hardware structure of the processor 100 include a CPU, a GPU, a programmable logic device (PLD), and an application specific integrated circuit (ASIC). The CPU is a general-purpose processor that executes a program and acts as various functional units. The GPU is a processor specialized in image processing.

The PLD is a processor capable of changing a configuration of an electric circuit after manufacturing a device. An example of the PLD is a field programmable gate array (FPGA). The ASIC is a processor comprising a dedicated electric circuit specifically designed to execute a specific process.

One processing unit may be configured of one of these various processors or may be configured of two or more processors of the same type or different types. Examples of a combination of various processors include a combination of one or more FPGAs and one or more CPUs, and a combination of one or more FPGAs and one or more GPUs. Another example of a combination of various processors includes a combination of one or more CPUs and one or more GPUs.

A plurality of functional units may be configured by using one processor. As an example of configuring a plurality of functional units by using one processor, there is an aspect in which, as typified by a computer such as a client or a server, one processor is configured by a combination of one or more CPUs and software such as a system on a chip (SoC), and the processor is caused to act as a plurality of functional units.

As another example of configuring a plurality of functional units by using one processor, there is an aspect in which a processor that realizes functions of an entire system including a plurality of functional units by using one IC chip is used. Note that the term "IC" is an abbreviation for Integrated Circuit.

As described above, the various functional units are configured by using one or more of the above described various processors as a hardware structure. Furthermore, the hardware structure of the above described various processors is, more specifically, an electric circuit (circuitry) in which circuit elements such as semiconductor elements are combined.

A hardware configuration of the terminal device 18 shown in FIG. 5 can also be applied to a control device, the controller 16, and the server 20 of the imaging drone 12 shown in FIG. 1.

[Procedure of Information Processing Method According to Embodiment]

Figure 6:
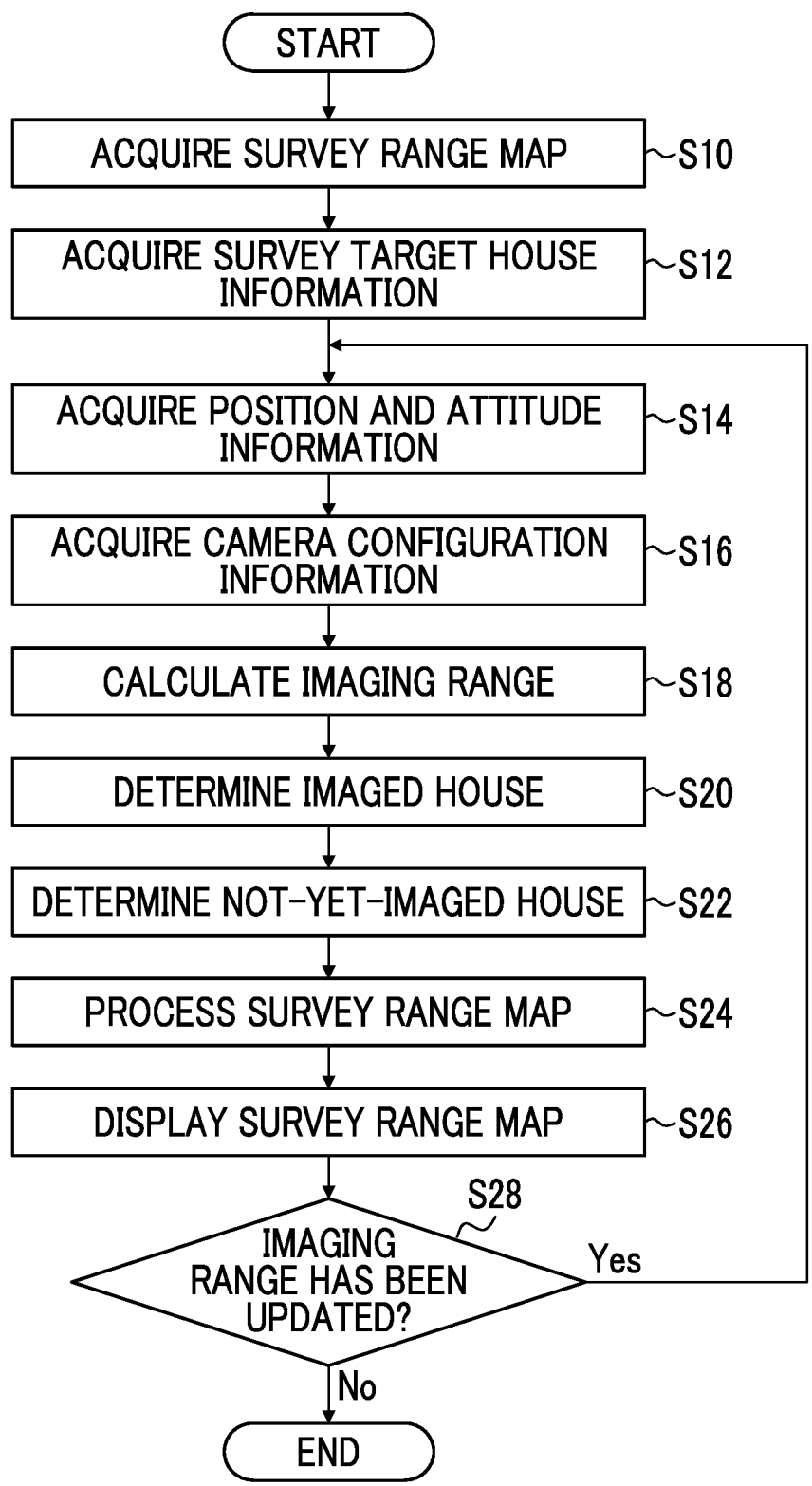
FIG. 6 is a flowchart showing a procedure of an information processing method according to the embodiment.

FIG. 6 is a flowchart showing a procedure of an information processing method according to the embodiment. In a survey range map acquisition step S10, the survey range map acquisition unit 80 shown in FIG. 4 acquires the survey range map from the server 20.

In a survey target house information acquisition step S12, the survey target house information acquisition unit 86 acquires the survey target house information from the server 20. A survey target house information display step of displaying the survey target house information acquired in the survey target house information acquisition step S12 may be executed.

In a position and attitude information acquisition step S14, the camera attitude information acquisition unit 82 acquires the position information and attitude information of the camera 14. In the position and attitude information acquisition step S14, the camera attitude information acquisition unit 82 can acquire sensor information from various sensors provided in the imaging drone 12 and calculate a position and an attitude of the camera 14 based on the acquired sensor information. A camera position and attitude information display step of displaying the position information of the camera 14 and the attitude information of the camera 14 which are acquired in the position and attitude information acquisition step S14 may be executed.

In a camera configuration information acquisition step S16, the camera configuration information acquisition unit 83 acquires the camera configuration information of the camera 14 that is stored in advance. In the camera configuration information acquisition step S16, camera configuration information stored in the controller 16 or the server 20 may be acquired. A camera configuration information display step of displaying the camera configuration information acquired in the camera configuration information acquisition step S16 may be executed.

In an imaging range calculation step S18, the imaging range calculation unit 84 calculates the imaging range F of the camera 14 using the position information of the camera 14, the attitude information of the camera 14, and the camera configuration information of the camera 14. An imaging range information storage step of storing imaging range information generated in the imaging range calculation step S18 may be executed.

In an imaged house determination step S20, the imaged house determination unit 88 determines the survey target house included in the imaging range F of the camera 14 calculated in the imaging range calculation step S18 as the imaged house. An imaged house information storage step of storing imaged house information generated in the imaged house determination step S20 may be executed. In addition, a determination history storage step of storing a history of determination results in the imaged house determination step S20 may be performed for all the survey target houses.

In a not-yet-imaged house determination step S22, the not-yet-imaged house determination unit 90 determines a not-yet-imaged house that has not been determined as the imaged house in the imaged house determination step S20 among the survey target houses. A not-yet-imaged house information storage step of storing not-yet-imaged house information generated in the not-yet-imaged house determination step S22 may be performed. The imaged house determination step S20 and the not-yet-imaged house determination step S22 may be executed in parallel.

In a survey range map processing step S24, the survey range map processing unit 92 processes the survey range map. In the survey range map processing step S24, the not-yet-imaged-house image generation unit 94 generates the not-yet-imaged-house image representing the not-yet-imaged house, and the survey range map processing unit 92 performs processing of superimposing the not-yet-imaged-house image on the survey range map.

In the survey range map processing step S24, the imaging-range image generation unit 96 can generate the imaging-range image representing the imaging range F of the camera 14. In addition, in the survey range map processing step S24, the imaged-house image generation unit 98 can generate the imaged-house image representing the imaged house. The survey range map processing unit 92 can perform processing of superimposing the imaging-range image or the like on the survey range map.

In a survey range map display step S26, the display control unit 99 transmits the display signal representing the processed survey range map, to the display 18A. The display 18A displays the survey range map on which the not-yet-imaged-house image is superimposed.

In an imaging range update determination step S28, the terminal device 18 determines whether or not the imaging range F of the camera 14 has been updated. Examples of the example in which the imaging range F of the camera 14 is updated include movement of the imaging position, and re-imaging.

For example, in a case in which the camera attitude information acquisition unit 82 acquires new position information of the camera 14, the terminal device 18 determines that the imaging range F of the camera 14 has been updated. In addition, in a case in which a user input signal representing the performance of the re-imaging is acquired, the terminal device 18 can determine that the re-imaging is performed.

In the imaging range update determination step S28, in a case in which the terminal device 18 determines that the imaging range F of the camera 14 has been updated, the determination result is Yes. In a case in which the determination result is Yes, the process proceeds to the position and attitude information acquisition step S14, and steps from the position and attitude information acquisition step S14 to the imaging range update determination step S28 are executed until the determination result of No is made in the imaging range update determination step S28. In a case in which the imaging range F is updated, the camera configuration information acquisition step S16 can be omitted.

On the other hand, in the imaging range update determination step S28, in a case in which the terminal device 18 determines that the imaging range F of the camera 14 has not been updated, the determination result is No. In a case in which the determination result is No, a predetermined termination process is executed, and the procedure of the information processing method is terminated.

[Specific Example of Calculation of Imaging Range]

The calculation of the imaging range F of the camera 14 shown in FIG. 1 includes calculation of the angle of view of the camera 14 and calculation of the imaging range F of the camera 14 based on the angle of view of the camera 14.

Figure 7:
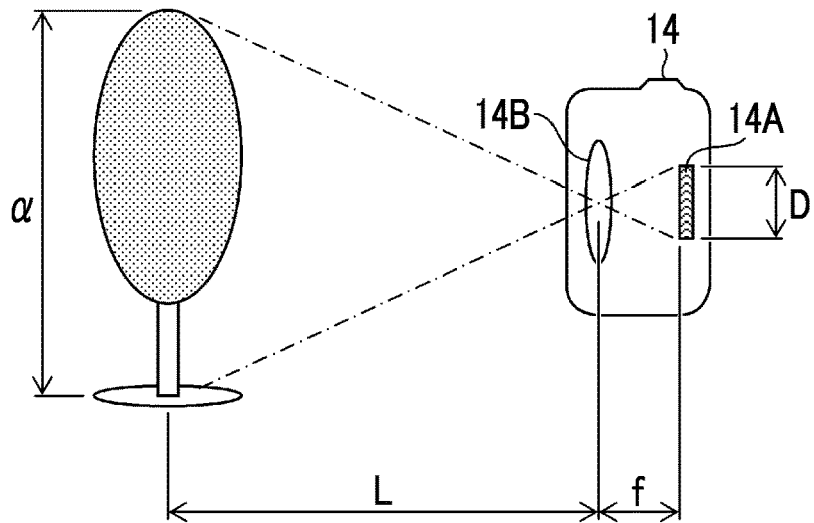
FIG. 7 is a schematic diagram of an angle-of-view calculation method.

FIG. 7 is a schematic diagram of an angle-of-view calculation method. It is assumed that a size of the image sensor 14A provided in the camera 14 is D, a focal length of the imaging lens 14B provided in the camera 14 is f, and an imaging distance is L. An angle of view α in a case in which there is no distortion of the imaging lens 14B is expressed as α=(D×L)/f. The angle of view a here means a length of one side of the imaging range in a case in which the imaging range F is quadrangular, corresponding to a planar shape of the image sensor 14A. In a case in which the imaging range F is rectangular, lengths of two sides orthogonal to each other are calculated as the angle of view a.

Figure 8:
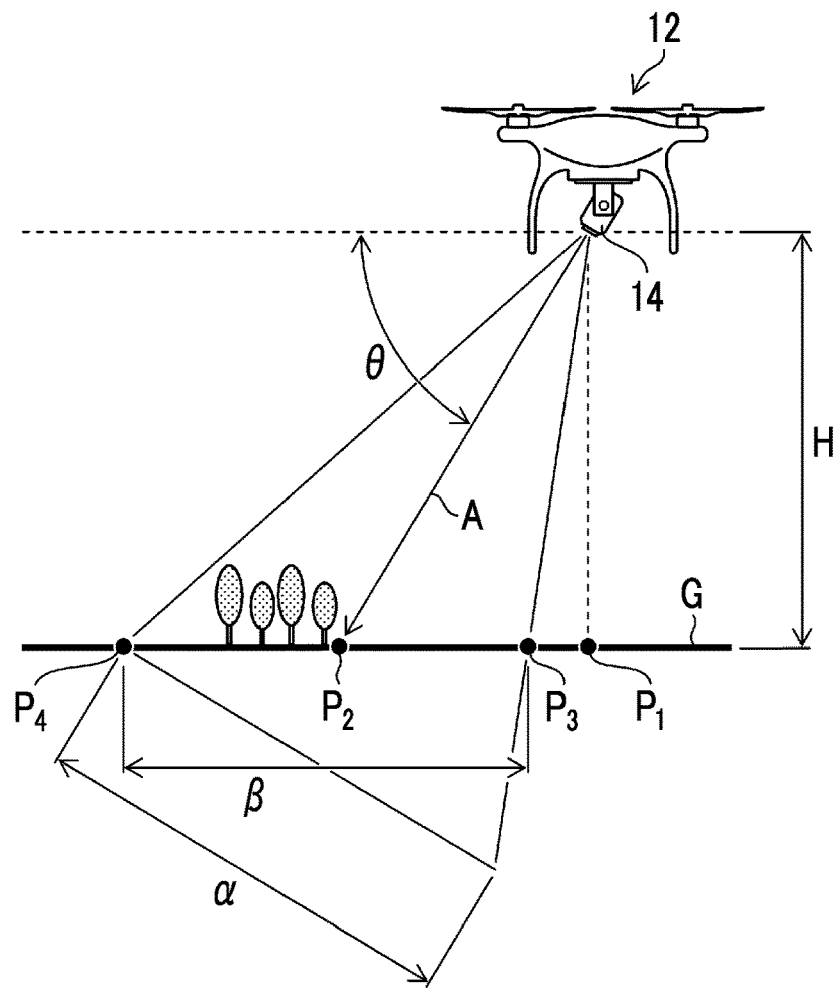
FIG. 8 is a schematic diagram of imaging range calculation.

FIG. 8 is a schematic diagram of imaging range calculation. An imaging range of the camera 14 on a ground G is a cross section obtained in a case in which an imaginary quadrangular pyramid, whose apex is a principal point of the imaging lens 14B provided in the camera 14 and whose perpendicular line is an optical axis A of the imaging lens 14B, intersects the ground G.

A flight altitude H of the imaging drone 12 corresponds to an imaging distance L shown in FIG. 7. The flight altitude H is calculated by correcting a detection value of the atmospheric pressure sensor 32 shown in FIG. 2 using a relative height. The flight altitude may store a value based on GPS positioning acquired by using the GPS receiver 30 and a value based on the detection value of the atmospheric pressure sensor 32.

For example, it is possible to acquire the flight altitude H based on GPS positioning immediately after the imaging drone 12 takes off, and acquire the corrected flight altitude H using the detection value of the atmospheric pressure sensor 32 during the flight of the imaging drone 12.

θ is a depression angle of the camera 14, and is calculated based on the attitude information of the imaging drone 12 and the attitude information of the camera 14. Reference numeral $P_1$ represents an imaging position of the imaging drone 12. A coordinate value of the imaging position $P_1$ is calculated based on latitude information and longitude information of the imaging drone 12.

A point $P_2$ is a point where the optical axis A of the imaging lens 14B intersects the ground G. A point $P_3$ is one end of the imaging range. A point $P_4$ is the other end of the imaging range.

A coordinate value of the point $P_3$ and a coordinate value of the point $P_4$ can be calculated by applying the parameters shown in FIG. 8 to the geometric operation. A length β of any one side constituting the imaging range is calculated as a distance between the point $P_3$ and the point $P_4$.

The imaging range of the camera 14 provided in the imaging drone 12 during flight on the ground G has a trapezoidal shape in which a base on a side close to the camera 14 is relatively short and a base on a side far from the camera 14 is relatively long. The ground referred to here is a surface that serves as a reference for the altitude of the imaging drone 12.

The imaging range of the camera 14 can be defined by using the coordinate values of the two-dimensional coordinate system defined in the survey range map. For example, the imaging range of the camera 14 can be defined by using the coordinate values of the respective apexes of the trapezoidal shape representing the imaging range.

The imaging range of the camera 14 can be defined by using the position information of the imaging drone 12. For example, the latitude and longitude of each apex of the trapezoidal shape representing the imaging range may be calculated based on the latitude and longitude of the imaging drone 12.

[Specific Example of Survey Range Map]

Figure 9:
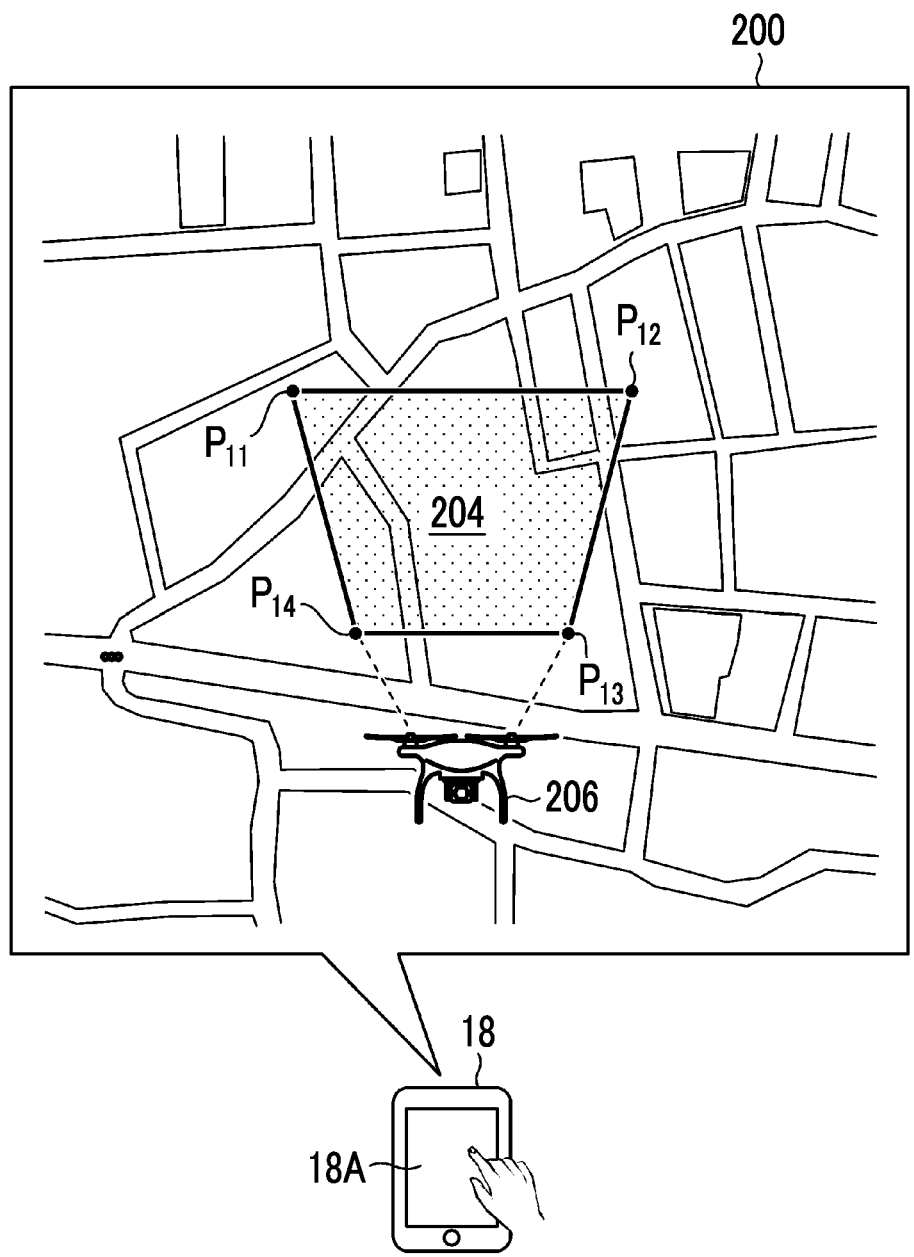
FIG. 9 is an explanatory diagram of a survey range map.

FIG. 9 is an explanatory diagram of a survey range map. FIG. 9 shows a survey range map 200 corresponding to a part of the survey range SA in accordance with a size of the display 18A of the terminal device 18. An imaging range 204 of the camera 14 and position information 206 of the imaging drone 12 are superimposed on the survey range map 200. Coordinate values in the survey range map 200 are defined for an apex $P_{11}$, an apex $P_{12}$, an apex $P_{13}$, and an apex $P_{14}$ constituting the imaging range 204 of the camera 14. Similarly, coordinate values in the survey range map 200 are defined for the position information 206 of the imaging drone 12. Note that the imaging range 204 corresponds to the imaging range F shown in FIG. 1.

FIG. 9 shows an aspect in which an image simulating the imaging drone 12 is applied as the position information 206 of the imaging drone 12, but any image, text information, or the like can be applied to the position information 206 of the imaging drone 12. The position information 206 of the imaging drone 12 described in the embodiment is an example of the camera position information.

In a case in which an operator, such as an operator of the imaging drone 12, touches any position of the display 18A, the terminal device 18 may enlarge and display the survey range map 200 with a position of the survey range map 200 corresponding to the touched position as a center.

In addition, in a case in which the operator scrolls any position of the display 18A, the terminal device 18 may change a region of the survey range map 200 to be displayed on the display 18A in response to the scrolling of the operator.

That is, the terminal device 18 can change a display aspect of the survey range map 200 to be displayed on the display 18A in response to the operation of the operator in a case in which the operator operates the terminal device 18. The change in the display aspect of the survey range map 200 can include enlargement, reduction, shift, and the like.

Figure 10:
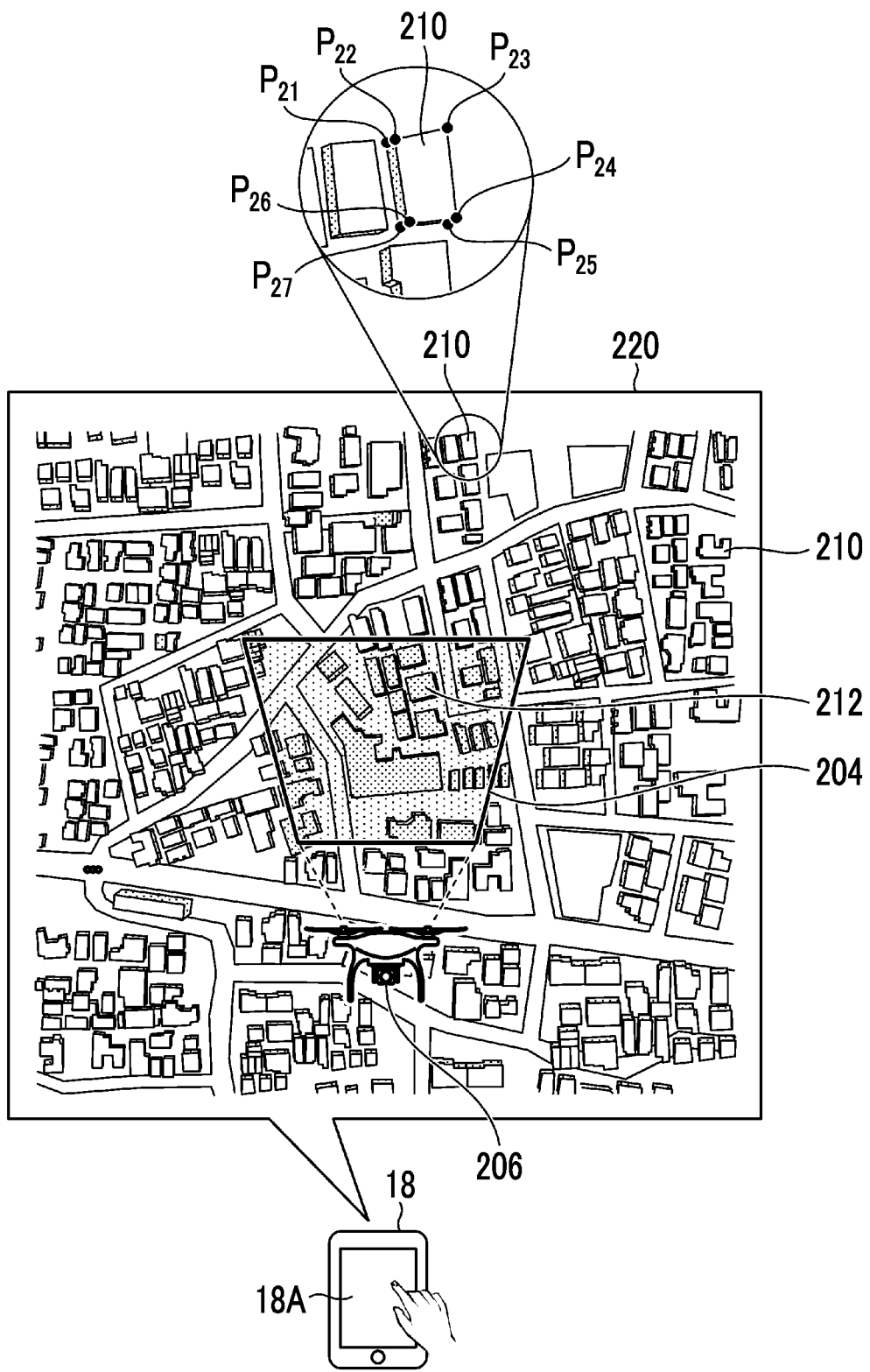
FIG. 10 is an explanatory diagram of a survey range map on which a not-yet-imaged-house image is superimposed.

FIG. 10 is an explanatory diagram of a survey range map on which a not-yet-imaged-house image is superimposed. On a survey range map 220 shown in FIG. 10, a survey target house image is superimposed as the survey target house information. The survey target house images are classified into a not-yet-imaged-house image 210 representing a not-yet-imaged house and an imaged-house image 212 representing an imaged house.

A polygonal shape corresponding to an outer peripheral shape of the survey target house is applied to the survey target house image. Coordinate values in the survey range map 200 are defined for an apex $P_{21}$, an apex $P_{22}$, an apex $P_{23}$, and an apex $P_{24}$ constituting the survey target house image. The coordinate values of the apexes constituting the survey target house image are applied to determination as to whether or not the survey target house is an imaged house or a not-yet-imaged house. In FIG. 10, the apexes constituting the optional not-yet-imaged-house image 210 which is the survey target house image are denoted by reference numerals $P_{21}$, $P_{22}$, $P_{23}$, $P_{24}$, $P_{25}$, $P_{26}$, and $P_{27}$ representing the apexes.

The not-yet-imaged house is a survey target house that is not determined to be included in the imaging range 204 of the camera 14. The imaged house is a survey target house that has been determined to be included in the imaging range 204 of the camera 14 at least once.

Examples of a building that can be a survey target house include a building listed in a basic resident register among buildings in each municipality. That is, the survey target house is defined by the local government where the housing damage certification survey is conducted.

In the survey range map 200 before the imaging range 204 is decided in the first imaging, the not-yet-imaged-house image 210 may be created for all the survey target houses, and the not-yet-imaged-house images 210 corresponding to all the survey target houses may be superimposed on the survey range map 200.

The determination of the imaged house and the determination of the not-yet-imaged house are performed in accordance with the decision of the imaging range 204, and the not-yet-imaged-house image 210 and the imaged-house image 212 are superimposed on the survey range map 220 according to the determination result.

Figure 11:
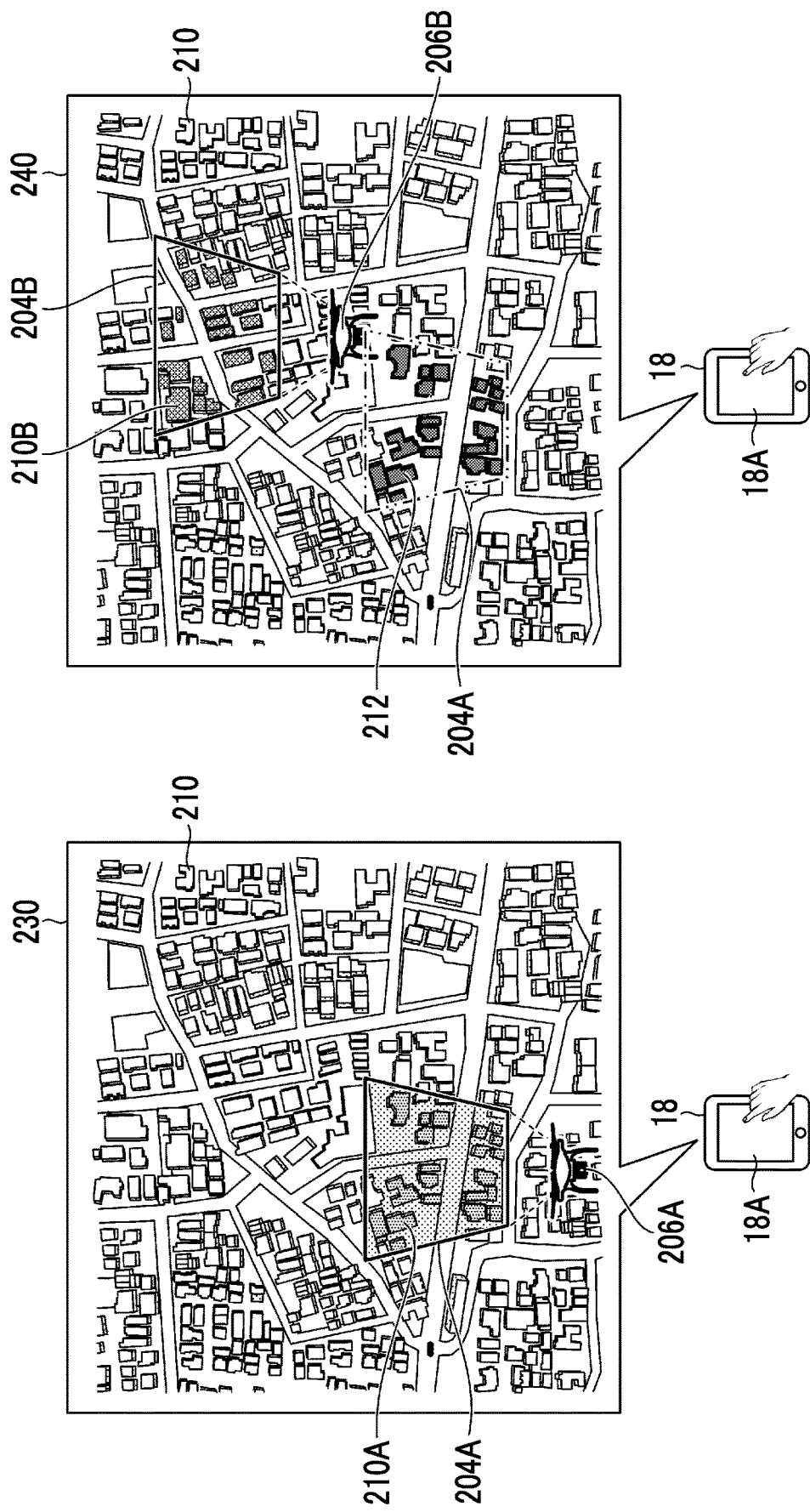
FIG. 11 is an explanatory diagram of transition of a survey range map.

FIG. 11 is an explanatory diagram of transition of a survey range map. FIG. 11 shows transition of a survey range map in a case in which imaging of the survey range is performed at a first imaging position and a second imaging position that are different from each other. A survey range map 230 is generated based on imaging of a survey range at the first imaging position. Position information 206A of the imaging drone 12 is superimposed on the first imaging position.

The imaged house determination unit 88 shown in FIG. 4 determines a not-yet-imaged house included in an imaging range 204A in the survey range map 230 as an imaged house. The not-yet-imaged house determination unit 90 determines a not-yet-imaged house of which coordinate values of one or more apexes in the not-yet-imaged-house image 210 are not included in the imaging range 204A, as a not-yet-imaged house that is not included in the imaging range 204A.

Since all apexes of the not-yet-imaged-house image 210A shown in FIG. 11 are included in the imaging range 204A, a not-yet-imaged house corresponding to the not-yet-imaged-house image 210A is determined as an imaged house. The imaged-house image 212 having the same outer shape as the not-yet-imaged-house image 210A is superimposed on the house determined as an imaged house, instead of the not-yet-imaged-house image 210A.

A survey range map 240 is generated based on imaging of a survey range at the second imaging position. For example, the second imaging position is an imaging position where imaging of the survey range is performed next to the first imaging position. Position information 206B of the imaging drone 12 is superimposed on the second imaging position.

In the survey range map 240, the imaged-house image 212 is superimposed on the position of the not-yet-imaged-house image 210A determined to be an imaged house in the survey range map 230. A display aspect that is visually distinguishable from the not-yet-imaged-house image 210 is applied to the imaged-house image 212. As an example of the display aspect applied to the imaged-house image 212, an aspect in which a color, a brightness, a pattern, and the like are differently set with respect to the not-yet-imaged-house image 210 can be applied.

The imaged house determination unit 88 shown in FIG. 4 determines a not-yet-imaged house included in an imaging range 204B in the survey range map 240 as an imaged house. The imaged-house image is superimposed on the position of the not-yet-imaged house determined as an imaged house, instead of the not-yet-imaged-house image 210B.

In this way, the imaging drone 12 is moved, the imaging position in the survey range is sequentially changed, and the imaged-house image 212 is superimposed on the survey target house that is included in the imaging range 204 of the camera 14 at least once, as the imaged house.

[Modification Example of Survey Range Map]

Figure 12:
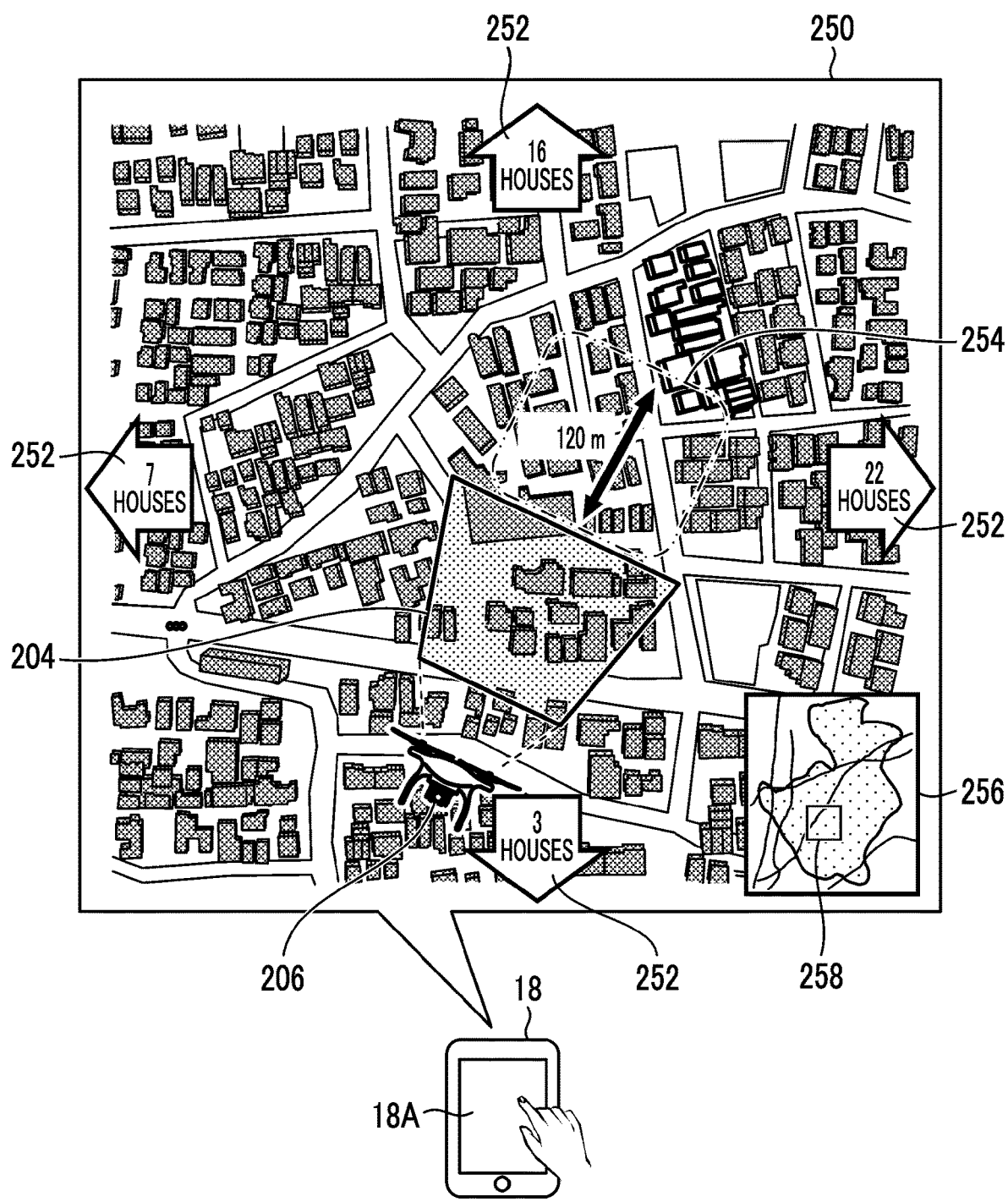
FIG. 12 is an explanatory diagram of a survey range map according to a modification example.

FIG. 12 is an explanatory diagram of a survey range map according to a modification example. A survey range map 250 shown in FIG. 12 includes navigation information. In FIG. 12, a first navigation image 252, a second navigation image 254, and a third navigation image 256 are illustrated as the navigation information.

The first navigation image 252 is an arrow line representing a direction in which a not-yet-imaged house is located with respect to the position of the imaging drone 12. In addition, the first navigation image 252 includes text information representing the number of the not-yet-imaged houses. As the number of the not-yet-imaged houses applied to the first navigation image 252, the number of the not-yet-imaged houses included in a range having a predetermined distance from the position of the imaging drone 12 is applied.

In the survey range map 250 shown in FIG. 12, the first navigation image 252 is disposed for each of the north, south, east, and west. The survey range map 250 may include the first navigation image 252 facing northeast, the first navigation image 252 facing southwest, and the like. In the survey range map 250, the first navigation image 252 in which the number of the not-yet-imaged houses is zero may be deleted.

The second navigation image 254 includes an arrow line representing a direction of the not-yet-imaged house of interest at the position of the imaging drone 12 and text information representing a distance from the position of the imaging drone 12 to the not-yet-imaged house of interest.

As the distance from the position of the imaging drone 12 to the not-yet-imaged house of interest, a distance from the position of the imaging drone 12 to a position on a flight path of the imaging drone 12 corresponding to the position of the not-yet-imaged house of interest can be applied.

A wide area map showing the entire survey range SA is applied to the third navigation image 256. In the third navigation image 256, a frame 258 representing a region corresponding to the survey range map 250 is superimposed on the wide area map.

The first navigation image 252 described in the embodiment is an example of the first navigation information. The second navigation image 254 described in the embodiment is an example of the second navigation information. The third navigation image 256 described in the embodiment is an example of the third navigation information.

[Operations and Effects of Information Processing System and Information Processing Method According to Embodiment]

The information processing system and the information processing method according to the embodiment can obtain the following operations and effects.

[1]

The imaging range 204 of the camera 14 provided in the imaging drone 12 on the ground G and the not-yet-imaged-house image 210 representing the not-yet-imaged house are superimposed on the survey range map 220 representing the geographical information of the survey range. The survey range map 220 on which the not-yet-imaged-house image 210 is superimposed is displayed on the display 18A of the terminal device 18.

Accordingly, the operator of the imaging drone 12 can recognize the imaging range of the camera 14 during flight and the not-yet-imaged house, and can cause the imaging drone 12 to fly toward the not-yet-imaged house.

[2]

The imaged-house image 212 representing the imaged house is superimposed on the survey range map 220. The survey range map 220 on which the imaged-house image 212 is superimposed is displayed on the display 18A of the terminal device 18. Accordingly, the operator of the imaging drone 12 can distinguish between the not-yet-imaged house and the imaged house.

[3]

The position information 206 of the imaging drone 12 is superimposed on the survey range map 220. Accordingly, the operator of the imaging drone 12 can grasp the positions of the imaging drone 12 and the camera 14.

[4]

The first navigation image 252 representing the direction in which the not-yet-imaged house is located is superimposed on the survey range map 250. Accordingly, the operator of the imaging drone 12 can grasp the direction in which the not-yet-imaged house is located.

[5]

The first navigation image 252 includes the number of the not-yet-imaged houses in the direction represented by the first navigation image 252. Accordingly, it is possible to guide the imaging drone 12 according to the number of the not-yet-imaged houses.

[6]

The second navigation image 254 representing the direction from the camera 14 to the not-yet-imaged house of interest and the distance from the camera 14 to the not-yet-imaged house of interest is superimposed on the survey range map 250. Accordingly, the operator of the imaging drone 12 can grasp the direction and the distance from the camera 14 to the not-yet-imaged house of interest.

[7]

The third navigation image 256 including the wide area map showing the entire survey range is superimposed on the survey range map 250. Accordingly, the operator of the imaging drone 12 can grasp the position of the imaging drone 12 in the entire survey range.

[8]

A not-yet-imaged house of which all apexes constituting the not-yet-imaged-house image 210A are included in the imaging range 204A is determined as an imaged house. Accordingly, it is possible to suppress the occurrence of omission in the captured image of the imaged house.

A history of determination results is stored in a case in which all the survey target houses are determined as imaged houses. Accordingly, it is possible to avoid duplication of imaging for the same survey target house.

[Modification Example of Information Processing System According to Embodiment]

A part of the information processing performed in the terminal device 18 may be performed by other devices of the terminal device 18, such as the controller 16 and the server 20. For example, the controller 16 may perform the estimation of the imaging range of the camera 14 on the ground G.

The terminal device 18 can acquire the survey range map 220, the position of the survey target house, and the size of the survey target house from the server 20, generate the not-yet-imaged-house image 210 in accordance with the performance of the imaging by the camera 14, and superimpose the not-yet-imaged-house image 210 on the survey range map 220. In addition, the terminal device 18 may acquire the survey range map 220 in which the two-dimensional coordinate system is set in advance.

In the embodiment of the present invention described above, the configuration requirements can be changed, added, or deleted as appropriate without departing from the spirit of the present invention. The present invention is not limited to the embodiment described above, and many modifications can be made by a person having ordinary knowledge in the art within the technical idea of the present invention. In addition, the embodiment, modification example, and application example may be combined as appropriate.

EXPLANATION OF REFERENCES

10: information processing system
12: imaging drone
12A: main body
12B: rotor
13: gimbal
14: camera
14A: image sensor
14B: imaging lens
16: controller
18: terminal device
18A: display
20 server
22: network
30 GPS receiver
32: atmospheric pressure sensor
34: azimuth sensor
36: gyro sensor
38: communication interface
50 user interface
52: imaging setting unit
54: flight control unit
56: sensor data storage unit
58: image data storage unit
60 imaging control unit
62: communication interface
80 survey range map acquisition unit
82: camera attitude information acquisition unit
83: camera configuration information acquisition unit
84: imaging range calculation unit
86: survey target house information acquisition unit
88: imaged house determination unit
90 not-yet-imaged house determination unit
92: survey range map processing unit
94: not-yet-imaged-house image generation unit
96: imaging-range image generation unit
98: imaged-house image generation unit 99: display control unit
100: processor
102: computer-readable medium
104: communication interface
106: input/output interface
108: bus
110: input device
120: image processing program
122: storage control program
124: communication control program
126: display control program
200: survey range map
204: imaging range
204A: imaging range
204B: imaging range
206: position information of imaging drone 12
206A: position information of imaging drone 12
210: not-yet-imaged-house image
210A: not-yet-imaged-house image
210B: not-yet-imaged-house image
212: imaged-house image
220: survey range map
230: survey range map
240: survey range map
250: survey range map
252: first navigation image
254: second navigation image
256: third navigation image
S10 to S28: each step of information processing method

What is claimed is:

1. An information processing apparatus comprising:
a processor; and
a memory in which a program to be executed by the processor is stored,
wherein the processor executes a command of the program to
acquire position and attitude information representing a position of a camera mounted on a flying object and an attitude of the camera,
acquire camera configuration information including an optical configuration of the camera,
calculate an imaging range of the camera based on the position and attitude information and the camera configuration information,
acquire a survey range map showing a survey range,
acquire survey target house information including a position of a survey target house in the survey range map,
determine whether or not the survey target house is included in the imaging range,
specify a not-yet-imaged house that does not have a history of being determined to be included in the imaging range, and
superimpose information on the not-yet-imaged house on the survey range map.

2. The information processing apparatus according to claim 1,
wherein the processor superimposes, on the survey range map, a not-yet-imaged-house image corresponding to the not-yet-imaged house.

3. The information processing apparatus according to claim 1,
wherein the processor superimposes, on the survey range map, information on an imaged house having a history in which the survey target house is determined to be included in the imaging range.

4. The information processing apparatus according to claim 3,
wherein the processor superimposes, on the survey range map, an imaged-house image corresponding to the imaged house.

5. The information processing apparatus according to claim 1,
wherein the processor superimposes, on the survey range map, camera position information representing a position of the camera in the survey range map.

6. The information processing apparatus according to claim 1,
wherein the processor superimposes, on the survey range map, first navigation information representing a direction in which the not-yet-imaged house is located.

7. The information processing apparatus according to claim 6,
wherein the processor superimposes, on the survey range map, the first navigation information including information representing the number of the not-yet-imaged houses in the direction represented by the first navigation information.

8. The information processing apparatus according to claim 1,
wherein the processor superimposes, on the survey range map, second navigation information representing a distance and a direction from the imaging range to the not-yet-imaged house of interest.

9. The information processing apparatus according to claim 1,
wherein the processor superimposes, on the survey range map, third navigation information including a wide area map in which an entirety of the survey range map is reduced.

10. The information processing apparatus according to claim 1,
wherein the processor acquires the position of the camera, an altitude of the camera, an orientation of an optical axis of the camera, and a depression angle of the optical axis, as the position and attitude information.

11. The information processing apparatus according to claim 1,
wherein the processor determines whether or not the not-yet-imaged house is included in the imaging range in a case in which the imaging range moves according to movement of the flying object.

12. The information processing apparatus according to claim 1,
wherein the processor stores a history in which the survey target house is determined to be included in the imaging range.

13. An information processing method executed by a computer, the method comprising:
acquiring position and attitude information representing a position of a camera mounted on a flying object and an attitude of the camera;
acquiring camera configuration information including an optical configuration of the camera;
calculating an imaging range of the camera based on the position and attitude information and the camera configuration information;
acquiring a survey range map showing a survey range;
acquiring survey target house information including a position of a survey target house in the survey range map;
determining whether or not the survey target house is included in the imaging range;

specifying a not-yet-imaged house that does not have a history of being determined to be included in the imaging range; and superimposing information on the not-yet-imaged house on the survey range map.

14. A non-transitory, computer-readable tangible recording medium on which a program for causing, when read by a computer, the computer to execute the information processing method according to claim 13 is recorded.

15. An information processing system comprising:

a flying object;

a camera mounted on the flying object; and an information processing apparatus equipped with a processor and a memory in which a program to be executed by the processor is stored, wherein the processor executes a command of the program to acquire position and attitude information representing a position of the camera mounted on the flying object and an attitude of the camera, acquire camera configuration information including an optical configuration of the camera, calculate an imaging range of the camera based on the position and attitude information and the camera configuration information, acquire a survey range map showing a survey range, acquire survey target house information including a position of a survey target house in the survey range map, determine whether or not the survey target house is included in the imaging range, specify a not-yet-imaged house that does not have a history of being determined to be included in the imaging range, and superimpose information on the not-yet-imaged house on the survey range map.

* * * * *